(12) United States Patent  (10) Patent No.: US 8,799,373 B2
Bian et al.  (45) Date of Patent: Aug. 5, 2014

(54) METHOD, SYSTEM AND APPARATUS FOR MESSAGE INTERWORKING

(75) Inventors: Yonggang Bian, Guangdong (CN); Lunjian Mou, Guangdong (CN); Guojun Xu, Guangdong (CN); Jue Wang, Guangdong (CN); Gang Liang, Guangdong (CN); Xiaobo Wang, Guangdong (CN); Cheng Huang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 12/704,348

(22) Filed: Feb. 11, 2010

(65) Prior Publication Data

US 2010/0146066 A1  Jun. 10, 2010

Related U.S. Application Data

(63) Continuation of application No. PCT/CN2008/072034, filed on Aug. 19, 2008.

(30) Foreign Application Priority Data

Aug. 23, 2007  (CN) .......................... 2007 1 0146146

(51) Int. Cl.
*G06F 15/16* (2006.01)
*H04L 12/58* (2006.01)
*H04L 29/06* (2006.01)
*H04L 12/66* (2006.01)

(52) U.S. Cl.
CPC ........ *H04L 65/1069* (2013.01); *H04L 12/5835* (2013.01); *H04L 65/104* (2013.01); *H04L 69/08* (2013.01); *H04L 51/04* (2013.01); *H04L 51/066* (2013.01); *H04L 12/66* (2013.01); *H04L 65/1006* (2013.01); *H04L 12/51* (2013.01)
USPC .......................................... 709/206; 709/227

(58) Field of Classification Search
CPC ..... H04L 51/04; H04L 51/066; H04L 12/581; H04L 12/5835; H04L 12/66; H04L 65/104; H04L 65/1069; H04L 69/08; H04L 65/1006
USPC .................................................. 709/206, 227
See application file for complete search history.

(56) References Cited

U.S. PATENT DOCUMENTS

2005/0243978 A1* 11/2005 Son et al. ................... 379/88.13
2008/0192733 A1*  8/2008 Song et al. .................... 370/352

FOREIGN PATENT DOCUMENTS

| CN | 1747567 A | * | 3/2006 |
| CN | 1897577 A | | 1/2007 |
| CN | 1897578 A | * | 1/2007 |
| CN | 1929434 A | * | 3/2007 |
| CN | 1929460 A | | 3/2007 |
| EP | 1 798 933 A1 | | 6/2007 |
| EP | 1903724 A1 | | 3/2008 |
| WO | WO 2006/126959 A2 | | 11/2006 |

OTHER PUBLICATIONS

State Intellectual Property Office of the People'S Republic of China, Examination Report in Chinese Patent Application No. 200710146146.7 (Jun. 2, 2010).
State Intellectual Property Office of the People'S Republic of China, English Translation of Written Opinion of the International Searching Authority in International Patent Application No. PCT/CN2008/072034 (Nov. 20, 2008).
Rejection Decision in corresponding Chinese Patent Application No. 200710146146.7 (Dec. 5, 2012).
$3^{rd}$ Office Action in corresponding Chinese Patent Application No. 200710146146.7 (Jul. 23, 2012).

* cited by examiner

*Primary Examiner* — Hee Soo Kim
(74) *Attorney, Agent, or Firm* — Leydig, Voit & Mayer, Ltd.

(57) ABSTRACT

A method for message interworking, a Session Initiation System messaging server, an interworking gateway and a system for message interworking are disclosed. The method for message interworking includes: receiving, by an SIP messaging server, an SIP message, and routing the SIP message to a recipient; receiving an SIP response to the SIP message; sending the SIP message to an interworking gateway when it is determined that message interworking is required, so that the interworking gateway may perform a protocol conversion on the SIP message and send the converted non-SIP message to a corresponding non-SIP messaging system, or, so that the interworking gateway may establish a session between the interworking gateway itself and a sender terminal, receive an SIP session message via the established session, perform a protocol conversion on the SIP session message and then send the converted non-SIP message to a corresponding non-SIP messaging system.

15 Claims, 10 Drawing Sheets

METHOD, SYSTEM AND APPARATUS FOR MESSAGE INTERWORKING

CROSS REFERENCE TO RELATED APPLICATIONS

This application is a continuation of International Application No. PCT/CN2008/072034, filed on Aug. 19, 2008, which claims priority to Chinese Patent Application No. 200710146146.7, filed on Aug. 23, 2007, both of which are hereby incorporated by reference in their entireties.

FIELD OF THE INVENTION

The present invention relates to communication technology, and more specifically, to a method, a system and an apparatus for message interworking.

BACKGROUND

With rapid growth of the mobile communication technology, as well as increasing communication demands from users, a variety of messaging services appear. The messaging services include messaging services based on standard protocols such as Short Message Service (SMS), Multimedia Messaging Service (MMS), Instant Messaging and Presence Service (IMPS), SIP based SIP (Session Initiation Protocol) Instant Message, SIP Instant Message and Presence Leveraging Extensions (SIMPLE) Instant Message, Converged IP Message (CPM) and so forth; and some messaging services based on proprietary protocols such as Fetion service, mobile instant communication service, mobile MSN and so forth.

Currently, a majority of users of messaging services are using conventional messaging services, for example, SMS, MMS, etc. When a new messaging service, e.g. the SIP SIMPLE IM or the CPM, is deployed, interworking between the new messaging service and the conventional messaging service should be taken into consideration to facilitate the users. In other words, a protocol conversion is required to be performed on a message based on the new messaging service before the message is transmitted to the conventional messaging service system. The user using the conventional messaging service may then receive the message.

FIG. 1 is a flowchart of a first conventional method for message interworking. As shown in FIG. 1, the method includes steps as follows.

At step 100, a sender terminal sends a message to a recipient terminal which uses a different protocol type. Firstly, the protocol used in the recipient terminal is carried in the message, and then the message is sent to a sender network device, e.g. a sender messaging server. At step 101, the sender network device determines, based on the protocol which is indicated in the message and used in the recipient terminal, that message interworking is required, and therefore sends the message to an Interworking Gateway (IW-GW). At step 102, after the IW-GW performs the protocol conversion on the message (i.e. signaling conversion, or signaling and data format conversion), the message is then sent, using the protocol of the recipient, to a recipient network device (e.g. a recipient messaging server). At step 103, the converted message is sent to the recipient terminal by the recipient network device.

As can be seen from the above solution, a different protocol type used in the recipient terminal needs to be indicated in the message when the message is sent from the sender terminal to the recipient terminal which uses the different protocol type. If the sender terminal can not learn the protocol type used in the recipient terminal, the message cannot be sent to the recipient network device, and thus to the recipient terminal.

FIG. 2 is a flowchart of a second conventional method for message interworking. In the procedure of the method, the recipient corresponds to a plurality of recipient terminals using different types of protocols, e.g. a recipient terminal and a mobile terminal using an instant communication service. As shown in FIG. 2, the method includes steps as follows.

At step 200, a sender terminal sends a message to a sender network device, e.g. a sender messaging server, where the message is to be sent to a recipient. At step 201, the sender network device routes the message to a recipient network device A which uses a protocol of the same type as the sender terminal. At step 202, when the recipient network device A determines that a recipient terminal A is off-line, it forwards the message to an IW-GW based on a forwarding configuration in the recipient terminal A, e.g. forwards the message to a recipient terminal B which uses a protocol of another type at the same recipient. At step 203, after a protocol conversion performed on the message by the IW-GW, the message is sent to the recipient network device B corresponding to the recipient terminal B, e.g. a recipient messaging server. At step 204, the recipient network device B forwards the converted message to the recipient terminal B, where the recipient terminal B is a recipient terminal using a protocol of another type according to the forwarding configuration in the recipient terminal A.

For example, the sender terminal using the instant communication service sends a message to the recipient terminal which uses the instant communication service as well. Meanwhile, a forwarding configuration is included in the recipient network configurations, e.g. to forward the message to a mobile terminal of the recipient. When an instant communication service server detects that the recipient terminal is off-line upon receipt of the message, it forwards the message to the IW-GW based on the forwarding configuration in the recipient terminal. The message is converted into a short message by the IW-GW, and is then forwarded to the mobile terminal of the recipient.

In the above solution, the message can be forwarded to another recipient terminal of the recipient. However, the forwarding procedure is performed based on the configuration in the recipient network. If there is no forwarding configuration in the recipient network, the message cannot be sent to the recipient network device B, and thus to the recipient terminal. Meanwhile, if the recipient network does not support the protocol type of the sender network, or, if the recipient does not subscribe to the service in use by the sender terminal, the message cannot be sent to the recipient network device B either.

In summary, when the SIP message is being sent from the sender terminal, the conventional methods for message interworking cannot guarantee that the SIP message be sent to a non-SIP messaging system corresponding to the recipient terminal, e.g. the Short Message Service (SMS) system, the Multimedia Messaging Service (MMS) system, the mailing system or the IMPS system.

SUMMARY

According to an embodiment of the present invention, a method for message interworking is provided to ensure that the SIP message is interworked and forwarded to the non-SIP messaging system corresponding to the recipient terminal.

According to another embodiment of the present invention, a system for message interworking is provided to ensure that the SIP message is interworked and forwarded to the non-SIP messaging system corresponding to the recipient terminal.

According to another embodiment of the present invention, an SIP messaging server is provided to ensure that the SIP message is interworked and forwarded to a non-SIP messaging system corresponding to the recipient terminal.

According to yet another embodiment of the present invention, an interworking gateway is provided to ensure that the SIP message is interworked and forwarded to the non-SIP messaging system corresponding to the recipient terminal.

To this end, the technical solutions according to the embodiments of the present invention are presented as follows.

A method for message interworking includes: (1) receiving an SIP message, and routing the SIP message to a recipient; and (2) receiving, by an SIP messaging server, an SIP response to the SIP message; sending, when it is determined that message interworking is required, the SIP message to an interworking gateway so that the interworking gateway performs a protocol conversion on the SIP message and sends the converted non-SIP message to a corresponding non-SIP messaging system; or, establishing, by the interworking gateway based on the SIP message, a session between the interworking gateway itself and a sender terminal, receiving an SIP session message via the established session, performing a protocol conversion on the SIP session message and then sends the converted non-SIP message to a corresponding non-SIP messaging system.

A message interworking system includes an SIP messaging server and an interworking gateway.

The SIP messaging server is configured to receive an SIP message, to route the SIP message to a recipient; to receive an SIP response message to the SIP message, and to send the SIP message to the interworking gateway when it is determined based on the SIP response message to the SIP message that message interworking is required.

The interworking gateway is configured to receive the SIP message, and to perform a protocol conversion on the received SIP message and then send the converted non-SIP message to a corresponding non-SIP message system; or, is configured to receive the SIP message, to establish a session between the interworking gateway itself and a sender terminal based on the SIP message, to receive an SIP session message based on the established session, and to perform a protocol conversion on the received SIP session message and then send the converted non-SIP message to a corresponding non-SIP message system.

An SIP messaging server includes a transceiving module, a confirming module and an interworking module.

The transceiving module is configured to receive an SIP message, to route the SIP message to a recipient, and to receive an SIP response to the SIP message.

The confirming module is configured to determine based on the SIP response received by the transceiving module whether interworking is required.

The interworking module is configured to forward the SIP message to an interworking gateway when the confirming module determines that the message interworking is required.

An interworking gateway includes: a receiving module, a converting module, and a forwarding module. The receiving module is configured to receive an SIP message. The converting module is configured to perform a protocol conversion on the SIP message and then send the converted non-SIP message to the forwarding module. The forwarding module is configured to send the message converted by the converting module to a non-SIP messaging system corresponding to the service.

An interworking gateway includes: a receiving module, a recipient service information obtaining module, a selecting module, a converting module, and a forwarding module.

The receiving module is configured to receive an SIP message. The recipient service information obtaining module is configured to obtain service information of a recipient terminal from a network address book, or from a Telephone Number Mapping (ENUM) Domain Name System server, or from a recipient network device.

The selecting module is configured to select one service from the service information obtained by the recipient service information obtaining module. The converting module is configured to perform a protocol conversion on the SIP message to convert the SIP message into a message corresponding to the service selected by the selecting module. The forwarding module is configured to send the message converted by the converting module to a non-SIP messaging system corresponding to the service.

Compared with the conventional art, the technical solution according to the embodiments of the present invention is that: an SIP messaging server routes a received SIP message to a recipient, determines based on a replied SIP response that an interworking is required, and then sends the SIP message to an interworking gateway; thus, the interworking gateway performs a protocol conversion on the SIP message, or performs a protocol conversion on an SIP session message received via a session which is established based on the SIP message, and then sends the converted non-SIP message to the non-SIP messaging system. Consequently, in situations such as, the recipient terminal which supports the service corresponding to the SIP message is off-line, or the recipient terminal does not support the service corresponding to the SIP message, or the sender terminal is not aware of the protocol type supported by the recipient terminal, or the recipient does not set a forwarding configuration, it may determine based on the SIP response that the interworking is required. Thus, the interworking gateway performs a protocol conversion on the SIP message or on the SIP session message, and then sends the converted non-SIP message to the corresponding non-SIP messaging system. As such, it is ensured that the SIP message is sent to the non-SIP messaging system corresponding to the recipient terminal.

BRIEF DESCRIPTION OF THE DRAWINGS

A brief introduction of the annexed drawings used in the description of the embodiments or the conventional art will be made below to facilitate further understanding of the technical solutions in the embodiments of the present invention or in the conventional art. Apparently, the annexed drawings in the description below illustrate only some embodiments of the present invention. It is readily appreciated by those skilled in the art that other drawings also be made based on the annexed drawings without creative work.

DETAILED DESCRIPTION

Detailed description will be made to the present invention in conjunction with the specific embodiments.

Figure 1:
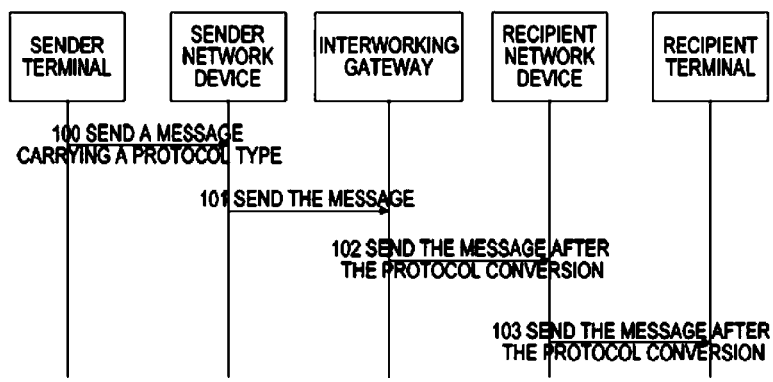
FIG. 1 illustrates a flowchart of a first existing method for message interworking.
Figure 2:
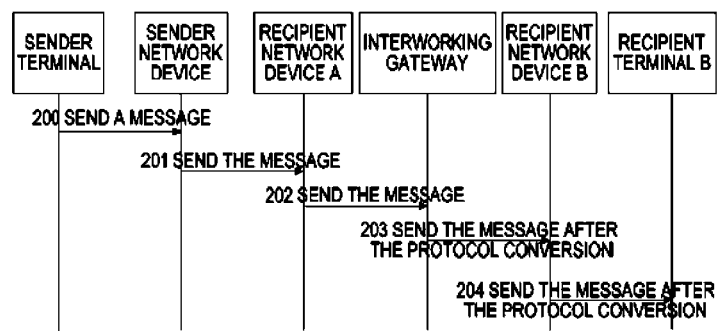
FIG. 2 illustrates a flowchart of a second existing method for message interworking.
Figure 3:
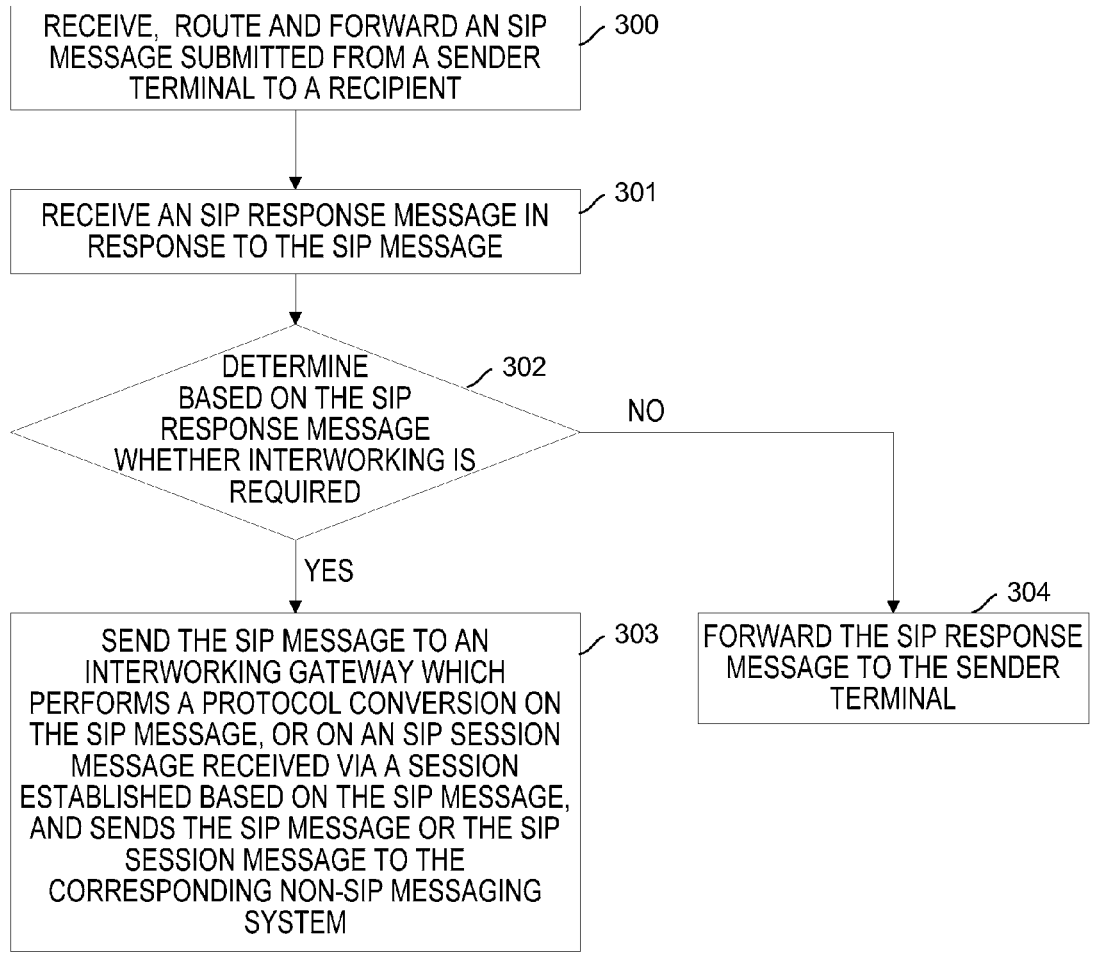
FIG. 3 illustrates a flowchart of a method for message interworking according to an embodiment of the present invention.

FIG. 3 illustrates a flowchart of a method for message interworking according to an embodiment of the present invention. As shown in FIG. 3, the method includes steps as follows.

At step 300, an SIP message submitted from a sender terminal is received, and is routing forwarded to a recipient.

At step 301, an SIP response message in reply to the SIP message is received.

At step 302, it is determined based on the received SIP response message whether interworking is required, and step 303 is performed when the interworking is required.

At step 303, the SIP message is sent to an interworking gateway which performs a protocol conversion on the SIP message and sends the converted non-SIP message to a corresponding non-SIP messaging system. Or, a session is established between the interworking gateway itself and the sender terminal based on the SIP message. An SIP session message is received based on the established session and is converted to a non-SIP message. The converted non-SIP message is sent to the corresponding non-SIP messaging system. Otherwise, step 304 is performed when the interworking is not required.

At step 304, the SIP response message is forwarded to the sender terminal.

According to the present embodiment, during the message interworking, an SIP messaging server determines an interworking type of the message, and forwards the SIP message to the interworking gateway corresponding to the recipient terminal. And then, the interworking gateway performs a protocol conversion on the SIP message and sends the converted non-SIP message to the non-SIP messaging system corresponding to the recipient terminal.

According to one embodiment of the present invention, a system for message interworking includes SIP messaging servers and interworking gateways. The SIP messaging server is configured to receive an SIP message, to route the SIP message to a recipient, to confirm an interworking type based on an SIP response when it is determined based on the SIP response to the SIP message that the message interworking is required, and to send the SIP message to the interworking gateway corresponding to the interworking type.

The interworking gateway is configured to perform a protocol conversion on the received SIP message and then send the converted non-SIP message to a corresponding non-SIP messaging system; and is further configured to receive the SIP message, to establish a session between the interworking gateway itself and the sender terminal based on the SIP message, to receive an SIP session message based on the established session, and to perform a protocol conversion on the received SIP session message and then send the SIP session message to the corresponding non-SIP messaging system.

The determination for the interworking type in the present invention is, in other words, the selection for the recipient terminal service.

Figure 4:
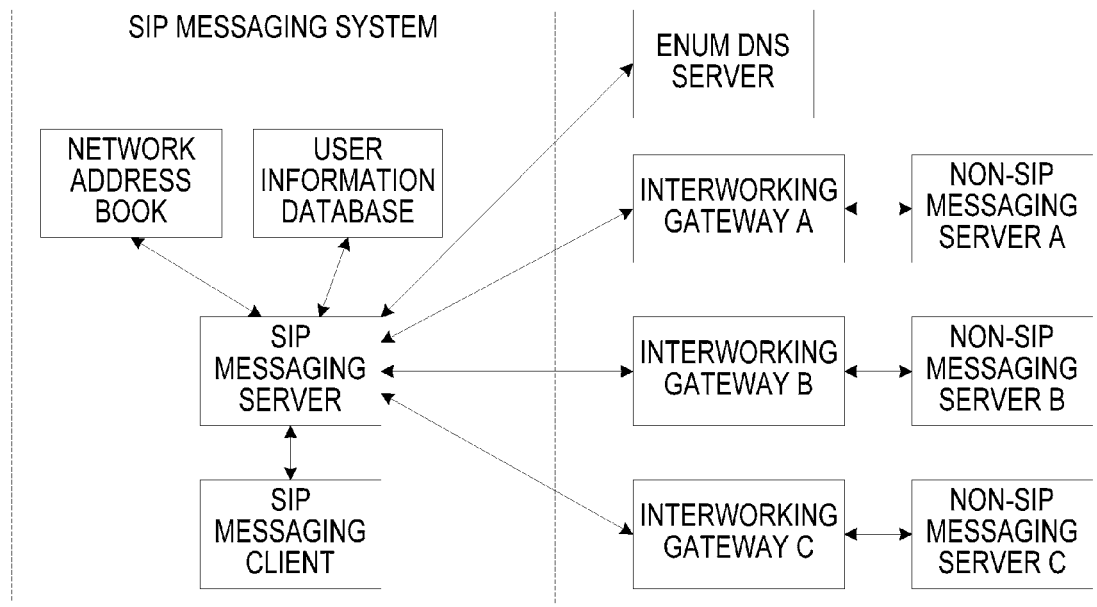
FIG. 4 illustrates a block diagram of a system for message interworking according to an embodiment of the present invention.

FIG. 4 illustrates a block diagram of a system for message interworking according to an embodiment of the present invention. As shown in FIG. 4, in addition to the system includes SIP messaging servers and interworking gateways, and besides, the system may further include one or more of the following devices: network address book, ENUM DNS server, and user information database. The network address book, the ENUM DNS server, and the user information database may provide the interworking gateways with service information of a recipient terminal. For example, the service information of a recipient terminal may be a relationship between a recipient terminal identification and a service identification. The SIP messaging server may further determine whether the recipient terminal supports the service corresponding to the SIP message based on the service information of the recipient terminal, e.g. whether the recipient terminal supports the SIMPLE or the CPM. When it is determined that the recipient terminal supports the service corresponding to the SIP message, the SIP message is sent to a recipient network device. Otherwise, an interworking type is determined.

The SIP messaging server is an SIP based messaging server such as an SIMPLE IM server, or a CPM server, etc.

In the present embodiment, one interworking gateway may be provided for each corresponding interworking type, or one interworking gateway may be provided for a plurality of interworking types. A logic module corresponding to the interworking type is provided for each interworking gateway respectively, which handles interworking and forwarding for a message corresponding to the interworking type respectively.

Figure 5A:
FIGS. 5A and 5B illustrate block diagrams of SIP messaging servers according to the embodiments of the present invention.
Figure 5B:
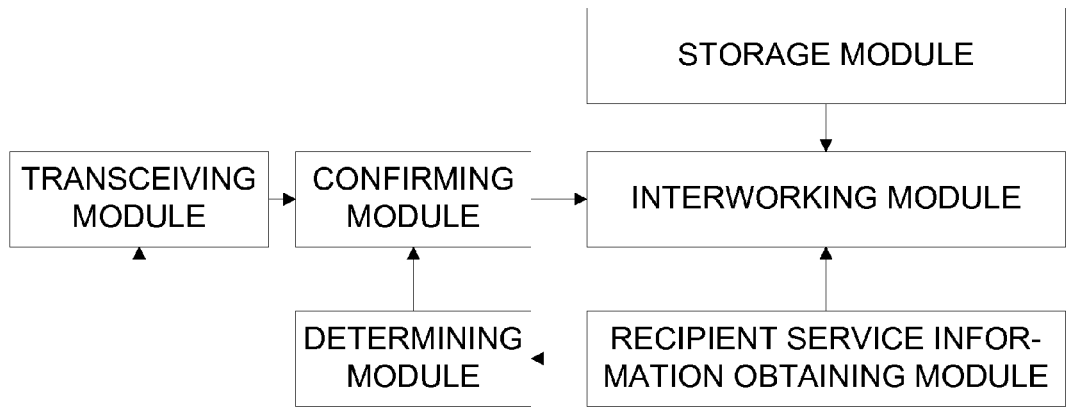

FIGS. 5A and 5B illustrate block diagrams of SIP messaging servers according to the embodiments of the present invention. As shown in FIG. 5A, the SIP messaging server includes a transceiving module, a confirming module and an interworking module.

Therein, the transceiving module receives an SIP message, routes the SIP message to a recipient, and receives an SIP response to the SIP message. The confirming module determines based on the SIP response received by the transceiving module whether an interworking is required, and sends the SIP message to the interworking module when it is determined that the interworking is required. The interworking module is configured to determine an interworking type, and to forward the SIP message to an interworking gateway corresponding to the interworking type.

Referring to FIG. 5B, optionally, the SIP messaging server may further include a storage module which is configured to store a relationship between the interworking type and the interworking gateway. At this point, the interworking module may further forward the SIP message to an interworking gateway corresponding to the interworking type based on both the SIP response and the relationship between the interworking type and the interworking gateway, wherein the relationship is stored in the storage module.

The SIP messaging server may further include a recipient service information obtaining module which is configured to obtain the service information of the recipient terminal from a network address book, or from an ENUM DNS server, or from a recipient network server. The corresponding interworking module may further determine the interworking type based on the service information of the recipient terminal.

The SIP messaging server may further include a determining module which is configured to determine whether a service of the same service type corresponding to the SIP message is included in the service information based on the obtained recipient service information, or to determine whether the recipient network device supports the service corresponding to the SIP message based on a domain corresponding to a Request Uniform Resource Identifier (Request URI) in the SIP message. If the service having the same service type corresponding to the SIP message is included in the service information or the recipient network device supports the service corresponding to the SIP message, the SIP message is forwarded by the transceiving module; otherwise, the SIP message is sent from the confirming module to the interworking module.

Figure 6:
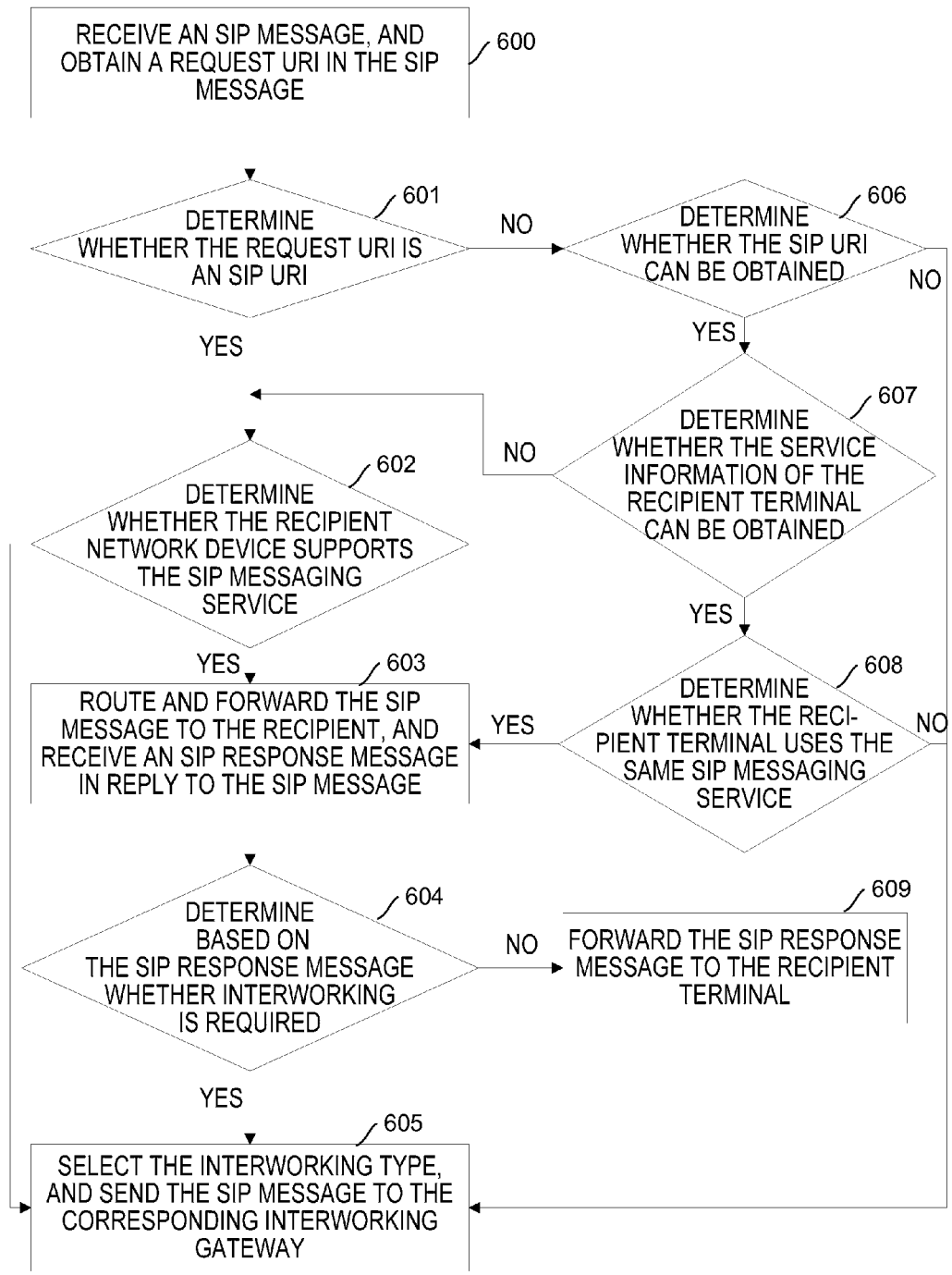
FIG. 6 illustrates a flowchart of a method for message interworking performed by the SIP messaging server according to an embodiment of the present invention.

FIG. 6 illustrates a flowchart of a method for message interworking performed by the SIP messaging server according to an embodiment of the present invention. As shown in FIG. 6, the method includes steps as follows.

Step 600: An SIP message sent from a client, i.e. the SIP message sent from a sender terminal, is received, and a Request Uniform Resource Identifier (Request URI) in the SIP message is obtained.

The Request URI is address information of a recipient, and a sender network routes the SIP message to a recipient network base on the Request URI.

Step 601: It is determined whether the Request URI is an SIP URI. If it is determined that the Request URI is an SIP URI, step 602 is performed; otherwise, step 606 is performed.

At this step, the determination of whether the Request URI is an SIP URI or not is available in the conventional art, which is omitted herein.

At step 602: It is determined whether the domain provides the same messaging service as the sender terminal based on a located domain of the SIP URI. If it is determined that the domain provides the same messaging service as the sender terminal, step 603 is performed; otherwise, step 605 is performed.

At this step, the sender network device is required to store information of services provided by other networks. For example, the information of services provided by other networks may be pre-stored in a network address book or in an SIP messaging server. During the implementation of the step, the SIP messaging server determines whether the domain supports a service corresponding to the SIP message based on both the located domain of the SIP URI and the pre-stored information. The service corresponding to the SIP message includes an SIP based SIMPLE IM service or a CPM service.

The present step may be omitted. In other words, the method may directly proceed to step 603 when it is determined that the Request URI is an SIP URI at step 601.

Step 603: The SIP message is routed and forwarded to the recipient, and an SIP response message in response to the SIP message is received.

Step 604: It is determined based on the SIP response message whether an interworking is required. If the interworking is required, step 605 is performed; otherwise, step 609 is performed.

At this step, determination on whether the interworking is required is made based on contents of SIP response message.

When the transmission of the SIP message fails, the SIP messaging server may determine based on a cause value for the transmission failure contained in the SIP response message whether the interworking is required. For example, SIP 404 NOT FOUND represents that the Request URI is not routable, and SIP 480 Temporarily Unavailable represents that the user is not available temporarily. The SIP messaging server determines that the interworking is required upon receipt of the SIP response message carrying such kind of cause value.

The SIP messaging server may determine whether the interworking is required further based on an interworking related indication in the user configuration of the sender or in the SIP message. For example, there is an indication in the sender terminal or network configuration or in the SIP message, such as, the interworking is required when the recipient network does not support the same messaging service as the sender terminal; the interworking is required when the recipient terminal is off-line; the interworking is required when the recipient terminal dose not use the message forwarding function, etc. Consequently, at this step, the SIP messaging server may determine based on such information whether the interworking is required.

Step 605: The interworking type is selected, and the SIP message is sent to the corresponding interworking gateway. Thus, the message interworking procedure is completed.

At this step, the selection for the interworking type is, in other words, the selection for the service of the recipient terminal, such as selecting for the SMS or the MMS supported by the recipient terminal, etc. It may determine the interworking type based on information of the sender configuration, the SIP message type, the Request URI type, etc., and may select the interworking gateway based on the preset relationship between the interworking type and the interworking gateway. For example, it may select the interworking type to be the short message, if the SIP message is to be converted into the short message for the transmission thereafter according to the presetting by the sender. Or, it may select the interworking type to be the short message or the multimedia message, if the Request URI type is of a mobile terminal number.

At this step, it may further require to query an ENUM DNS server or query a network address book based on the Request URI, in order to obtain other service information corresponding to the recipient terminal, and to thereby determine the interworking type based on the obtained service information. For example, the obtained service information of recipient terminal includes the MMS and the SMS. Moreover, it may select a service with the highest priority when each priority corresponding to the service is also included in the service information.

The SIP message is required to be sent to the interworking gateway after a protocol conversion if there is another protocol adopted between the SIP messaging server and the interworking gateway.

Step 606: It is determined whether the SIP URI is obtained based on the Request URI. If it is determined that the SIP URI is obtained based on the Request URI, step 607 is performed; otherwise, step 605 is performed.

The present step may be implemented by querying the network address book of the sender or querying the ENUM DNS server. For example, with the present step, the corresponding SIP URI may be found since the relationship between the Request URI of the recipient terminal and the SIP URI is preset in the network address book or in the ENUM DNS server.

Step 607: It is determined whether the service information of the recipient terminal can be obtained. If it is determined that the service information of the recipient terminal can be obtained, step 608 is performed; otherwise, step 602 is performed.

At this step, it is determined whether the service information of the recipient terminal can be obtained based on a result of querying the ENUM DNS server or a result of querying the network address book. Or, it may query the recipient network server for the service information of the recipient. For example, the service information of the recipient terminal may be obtained by querying the relationship between the SIP URI of the recipient terminal and the service information thereof, wherein the relationship is pre-stored in the ENUM DNS server, or in the address book, or in the recipient network server.

Step 608: It is determined whether the recipient terminal uses the same SIP messaging service as the sender terminal. If it is determined that the recipient terminal uses the same SIP messaging service as the sender terminal, step 603 is performed; otherwise, step 605 is performed.

Step 609: The SIP response message is forwarded to the sender terminal.

In the above description of the flowchart of the method for message interworking performed by the SIP messaging server, step 601 to step 602 and step 606 to step 608 may be omitted therein. In other words, the SIP messaging server may determine whether the interworking is required merely based on the SIP response message returned from the recipient network device. When step 601 to step 602 are omitted, the SIP messaging server proceeds to step 603, i.e. routing the received SIP message, and receiving the SIP response. At this point, the SIP messaging server may receive the SIP response message which is replied in the instance that an SIP/IP CORE corresponding to the SIP messaging server discovers that the Request URI in the SIP message is not routable, or which is replied in the instance that the recipient network device discovers that the recipient terminal is not available. The SIP response message, either received from the SIP/IP CORE or received from the recipient network device, may serve as a basis for the determination on whether the interworking is required at step 604.

If the SIP message is sent as an SIP MESSAGE, the SIP messaging server forwards the SIP message to the corresponding interworking gateway. And then, the SIP message is converted to a non-SIP message by the interworking gateway and the converted non-SIP message is sent to a non-SIP messaging system corresponding to the recipient terminal. Finally, the non-SIP messaging system forwards the non-SIP message to the recipient terminal according to the conventional art. The protocol conversion on the message performed by the interworking gateway is available in the conventional art, which is omitted herein.

First, the detailed description of the technical solution provided in the embodiments of the present invention will be made below taking an example that the SIP message is sent from a CPM user to the recipient terminal which does not support the CPM.

Figure 7:
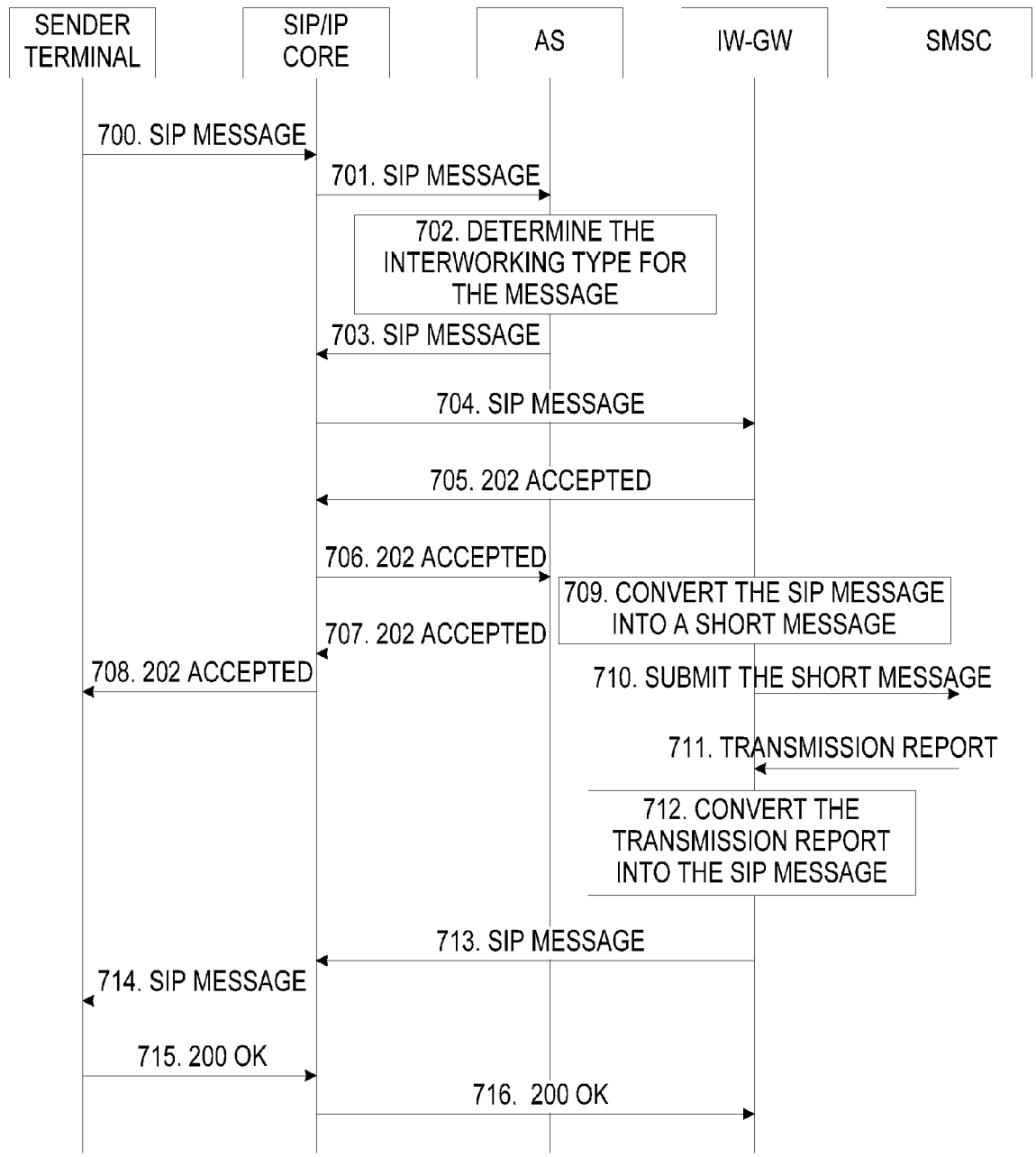
FIG. 7 illustrates a flowchart of a method for message transmitting in terms of a CPM user according to an embodiment of the present invention.

FIG. 7 illustrates a flowchart of a method for message transmitting in terms of a CPM user according to an embodiment of the present invention. As shown in FIG. 7, the method includes steps as follows.

Step 700: An SIP message is sent from a sender terminal to an SIP/IP CORE.

A Request URI in the SIP message is of an SIP URI, and the SIP message is firstly routed to the SIP/IP CORE of the sender.

Step 701: The SIP message is triggered to an Application Server (AS) by the SIP/IP CORE of the sender according to a triggering condition.

At this step, the triggering for the SIP message to an AS by the SIP/IP CORE according to a triggering condition is available in the conventional art, which is omitted herein.

Step 702: According to the message interworking procedure shown in FIG. 6, the AS determines that the CPM service is not provided in the recipient network based on the recipient network information stored in the sender network, and further determines based on the forwarding function set by the sender that the interworking is required. And then the service information of the recipient terminal is obtained by querying the ENUM or querying the network address book. According to obtained priorities of other services of the recipient and message body contents of the SIP message, for example, when an SMS form is of the highest priority in the obtained service information of the recipient terminal, and the SIP message has a shorter message body length in this embodiment, it is confirmed to forward the message in the SMS form.

Step 703 to step 705: AS adds an IW-GW address, which processes the interworking between the SIP message and the SMS message, into a Route header field in the SIP message, and sends the SIP message to the SIP/IP CORE. And then, the SIP/IP CORE routes the SIP message to the IW-GW, and receives an SIP 202 Accepted response replied by the IW-GW.

Step 706 to step 708: The SIP 202 Accepted response is returned to the sender terminal along a reverse path.

Step 709: The received SIP message is converted into a short message by the IW-GW.

At this step, if an indication is carried in the SIP message indicating that a transmission report is required, the IW-GW also needs to store the SIP message temporarily, and to associate the temporarily stored SIP message with the converted short message. Moreover, the IW-GW needs to set the sender of the converted message as including a Service Provider (SP) number which is allocated to the IW-GW, and a number which uniquely identifies the sender terminal, so that when the recipient terminal replies the response message, the short message is routed to the IW-GW and is then routed to the sender terminal by the IW-GW based on this number. Since the short messaging system merely supports numerical numbers, the number which identifies the sender terminal uniquely is obtained as a result of a reverse ENUM query of the SIP URI of the sender terminal. If the sender is identified by a TEL URI, a telephone number therein is utilized directly.

The present step and step 705 to step 708 are not limited to the implementation sequence, which may be adjusted flexibly according to IW-GW configurations.

Step 710: The IW-GW sends the converted message to a corresponding short message center based on the conversion result from the step 709. And then, the short message center sends the short message to the recipient terminal according to the existing method for sending the short message.

Step 711: The short message center returns a transmission report.

Step 712: The IW-GW receives the returned transmission report, and constructs the SIP message based on the transmission report.

Step 713 to step 716: The IW-GW sends the constructed SIP message to the sender terminal via the SIP/IP CORE, and receives an SIP 200 OK response returned from the sender terminal via the SIP/IP CORE.

Since one SIP message may be converted into a plurality of short messages due to size limits of the short message, step 710 to step 716 may therefore be performed repeatedly. The SIP message constructed based on the transmission report may be forwarded to the sender terminal via the AS.

If the SIP message is of an SIP session INVITE type, the SIP messaging server determines the interworking type and then sends the SIP message to the IW-GW. The IW-GW establishes a session with the sender terminal based on the SIP message. If the SIP messaging server participates in the transmission for the SIP session message, the SIP messaging server receives the SIP session message via the established session, and sends the received SIP session message to the IW-GW via the established session. The IW-GW performs the protocol conversion on the SIP session message and then sends it to the corresponding non-SIP messaging system. Otherwise, when the SIP messaging server does not participate in the transmission for the SIP session message, the IW-GW directly establishes a session with the sender terminal, and receives the SIP session message via the established session. After the protocol conversion performed on the SIP session message, the IW-GW sends the converted non-SIP message to the corresponding non-SIP messaging system. The detailed description of the technical solution provided in the embodiments of the present invention will be made below taking an example that the SIP message is sent from an IM user to the recipient terminal which does not subscribe to an IM service.

Figure 8:
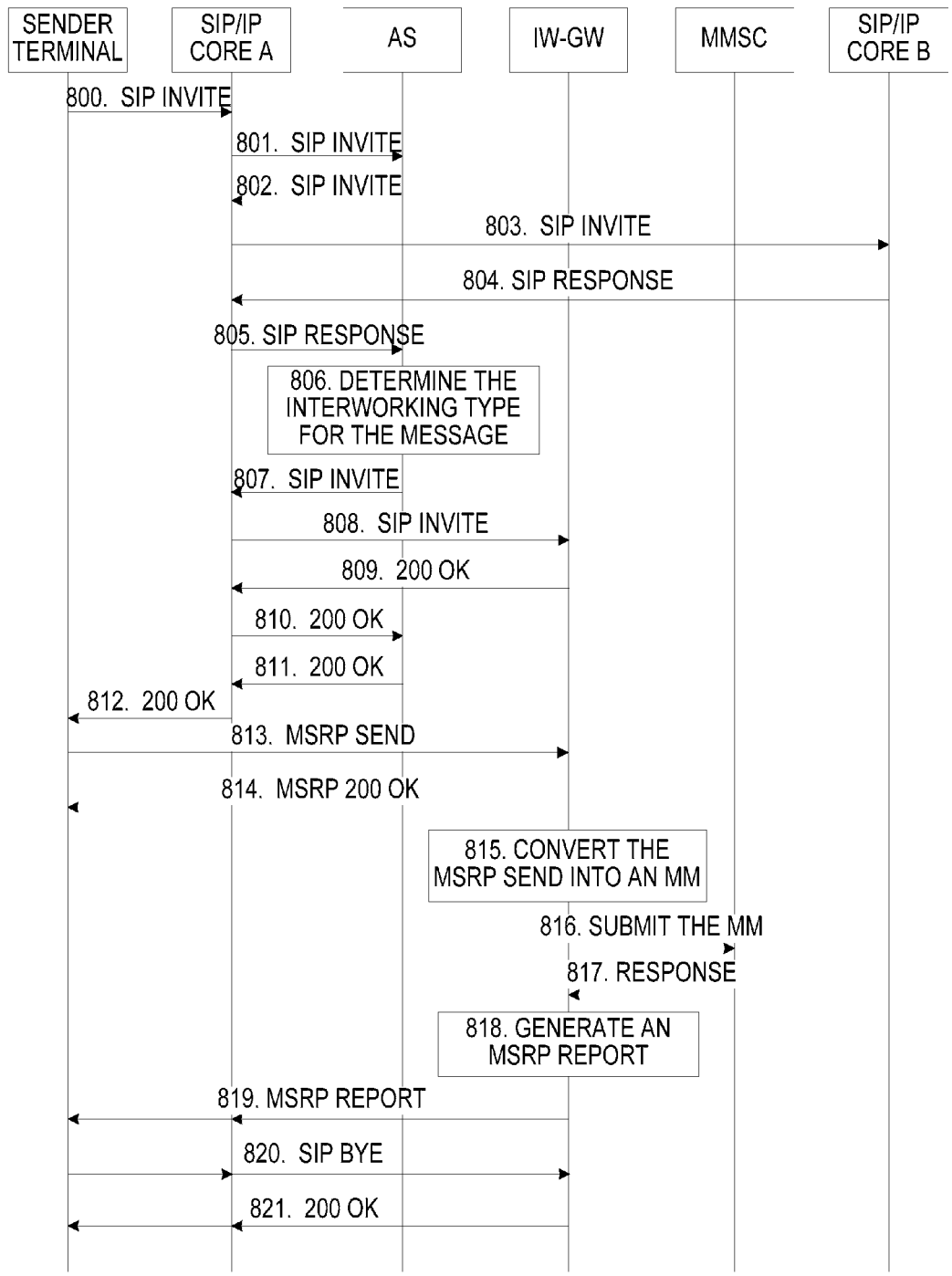
FIG. 8 illustrates a flowchart of a method for message transmitting in terms of an IM user according to an embodiment of the present invention.

FIG. 8 illustrates a flowchart of a method for message transmitting in terms of an IM user according to an embodiment of the present invention. As shown in FIG. 8, the method includes steps as follows.

Step 800: An SIP INVITE is sent from a sender terminal to an SIP/IP CORE A.

Step 801: The SIP INVITE is triggered to an AS by the SIP/IP CORE A of the sender according to a triggering condition.

Step 802: The AS processes accordingly, e.g. accounting, adding itself into a Message Session Relay Protocol (MSRP) path, and then returns the SIP INVITE to the SIP/IP CORE A.

Step 803 to step 805: The SIP/IP CORE A routes the SIP INVITE to an SIP/IP CORE B. The SIP/IP CORE B determines that it is an IM service request, e.g. an Accept-Contact header field value in the SIP INVITE is "+g.oma.sip-im", and determines that the recipient terminal is not the IM user based on user subscription information. Therefore, the SIP/IP CORE B replies an SIP response indicating that the recipient terminal is not the IM user. The SIP/IP CORE A routes the SIP response to the AS upon receipt of the SIP response replied by the SIP/IP CORE B.

Step 806: The AS determines based on the SIP response that an interworking is required and determines an interworking type.

At this step, the AS may obtain a preference configuration of the sender and confirm to send the IM in other forms based on the obtained user preference configuration. The AS also obtains other services of the recipient terminal and corresponding identifications by querying a network address book of the sender or by querying an ENUM. In this embodiment, the AS discovers that the recipient terminal may receive a multimedia message based on the query of the network address book of the sender, and obtains a corresponding Mobile Station Integrated Services Digital Network (MSISDN) number, and thereby determines to send the IM to the recipient terminal via the multimedia message.

Step 807: The AS sets a Request URI in the SIP INVITE as an obtained TEL URI of the recipient, and adds an address of the IW-GW, which performs the interworking between the IM and the multimedia message, into a Route header field in the SIP INVITE.

Step 808: The SIP/IP CORE A routes the SIP INVITE to the corresponding IW-GW based on the Route header field information.

Step 809 to step 812: The IW-GW receives the SIP INVITE, and replies an SIP 200 OK response to the sender terminal along a reverse path of the SIP INVITE, so that according to the SIP INVITE, an MSRP session is established between the sender terminal and the IW-GW with the SIP 200 OK response.

In actual practice, at such steps, a direct session may be established between the IW-GW and the sender terminal. Or, a session may be established between the IW-GW and the SIP messaging server, and also be established between the SIP messaging server and the sender terminal, so that the indirect session between the IW-GW and the sender terminal is established via the SIP messaging server. All such practices existing in the conventional art, which are omitted herein, may be logically construed as an establishment for a session between the IW-GW and the sender terminal.

Step 813 to step 814: The sender terminal sends the SIP session message, i.e. the IM in this embodiment, as an MSRP SEND message via the established MSRP session path. And then, the IW-GW receives the MSRP SEND message and replies an MSRP 200 OK response.

One IM may be sent via a plurality of MSRP SEND messages, the two steps above may therefore be performed repeatedly.

When the SIP messaging server participates in the transmission for the SIP session message, consequently, the steps include the receipt of the SIP session message by the SIP messaging server via the session, and the transmission for the SIP session message to the IW-GW via the session.

Step 815: The IW-GW performs a corresponding processing based on the received MERP SEND message, i.e. converting the MSRP message to a Multimedia Message (MM).

Moreover, the IW-GW may select to perform the protocol conversion upon receipt of a complete message, or to perform the protocol conversion upon receipt of a single MSRP SEND message. The IW-GW also needs to set the sender of the converted message as a telephone number which includes, a number allocated to an IW-GW SP which is configured to route a message replied by the recipient terminal to the IW-GW, and a number identifying the sender terminal uniquely which is configured to route a message replied by the recipient terminal to the sender terminal. The number identifying the sender terminal uniquely is obtained by a reverse ENUM query based on a sender SIP URI. If the sender is identified by a TEL URI, a telephone number therein is utilized directly.

Step 816 to step 817: The IW-GW sends the converted message to a corresponding Multimedia Messaging Service Center (MMSC) based on the conversion result from the step 815. And then, the MMSC sends the converted message to the recipient terminal according to the existing method for sending the MM, and replies a response.

There may have a plurality of MMs for transmission according to the processing policy of the IW-GW, the two steps above may therefore be performed repeatedly.

Step 818 to step 819: The IW-GW receives the replied response, and constructs a corresponding MSRP REPORT based on the associated MSRP SEND. And then, the IW-GW sends the constructed MSRP REPORT to the sender terminal.

Step 820 to step 821: The sender terminal sends an SIP BYE request to the IW-GW in order to terminate the MSRP session. Accordingly, the IW-GW replies an SIP 200 OK response to the sender terminal to thereby terminate the MSRP session.

In the following embodiments, the SIP messaging server merely forwards the SIP message requiring the interworking to the IW-GW, and then the IW-GW determines the interworking type and processes the message interworking.

The message interworking system in the present embodiment includes the SIP messaging server and the IW-GW.

Therein, the SIP messaging server is configured to receive an SIP message, to route the SIP message to the recipient; and to send the SIP message to the IW-GW when it is determined based on an SIP response message in reply to the SIP message that the message interworking is required.

The interworking gateway is configured to perform a protocol conversion on the received SIP message after the interworking type is confirmed, and to send the converted non-SIP message to a corresponding non-SIP messaging system; or is further configured to receive the SIP message, to establish a session between the interworking gateway itself and the sender terminal based on the SIP message, to receive an SIP session message based on the established session, and convert the SIP session message into a non-SIP message, and to send the non-SIP message to the corresponding non-SIP messaging system.

Figure 9:
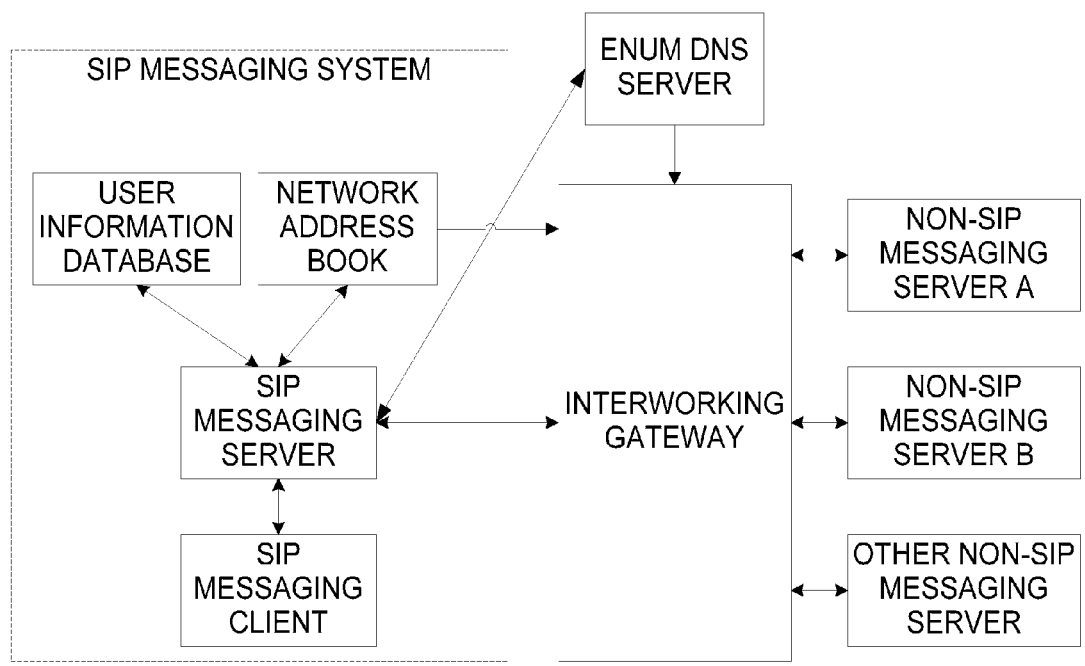
FIG. 9 illustrates a block diagram of a system for message interworking according to an embodiment of the present invention.

FIG. 9 illustrates a block diagram of a system for message interworking according to an embodiment of the present invention. As shown in FIG. 9, the message interworking system in the present embodiment may further include one or more sorts of devices below: network address book, ENUM DNS server, and user information database. The network address book, the ENUM DNS server, and the user information database are configured to provide the IW-GW with service information of the recipient terminal. The IW-GW determines the interworking type based on the obtained service information of the recipient terminal from the network address book, or from the ENUM DNS server, or from the user information database. That is, the interworking type is determined according to a selection for a service from the service information of the recipient terminal, or a selection for a service with a highest priority when priority information is included in the service information.

The SIP messaging server is an SIP based messaging server such as an SIMPLE IM server, or a CPM server, etc.

In the present embodiment, the IW-GW provides the SIP messaging server with a single interface. The present invention may also deploy an IW-GW to the sender terminal located domain, and meanwhile, deploy an IW-GW to the recipient terminal located domain. The IW-GW in the sender terminal domain routes the SIP message to the IW-GW in the recipient terminal domain. The IW-GW in the recipient terminal domain determines the interworking type and sends the converted message to the non-SIP messaging system in the recipient terminal.

Figure 10A:
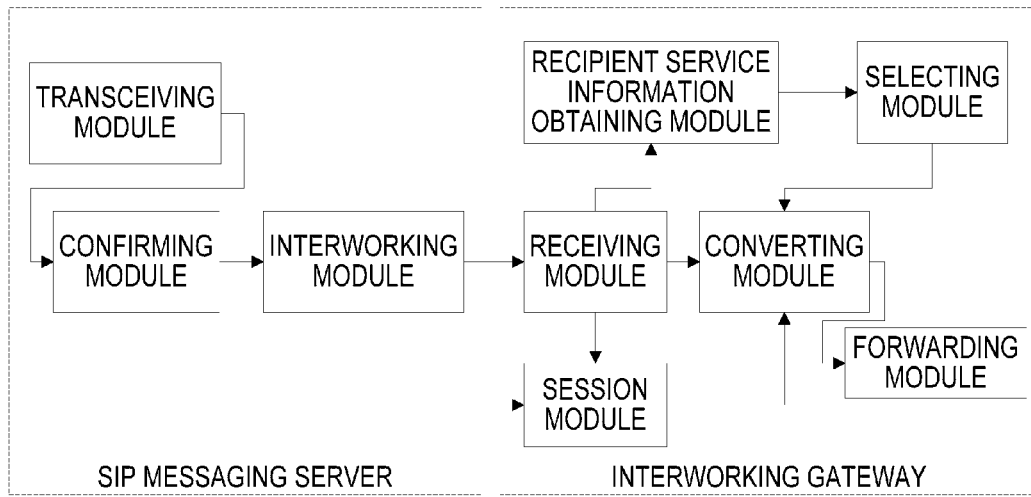
FIGS. 10A and 10B illustrate block diagrams of SIP messaging servers and interworking gateways according to the embodiments of the present invention.
Figure 10B:
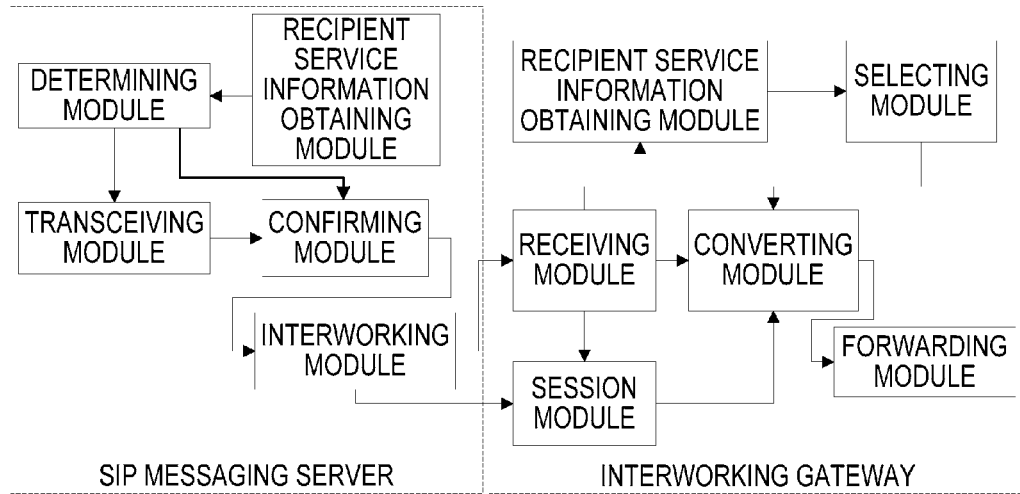

FIGS. 10A and 10B illustrate block diagrams of SIP messaging servers and interworking gateways according to the embodiments of the present invention. As shown in FIG. 10A, the SIP messaging server includes: a transceiving module which is configured to receive an SIP message, to route the SIP message to a recipient, and to receive an SIP response to the SIP message; a confirming module which is configured to determine based on the SIP response received by the transceiving module whether interworking is required, and to send the SIP message to the interworking module when it is determined that the interworking is required; an interworking module which is configured to forward the SIP message to an interworking gateway.

As shown in FIG. 10B, the SIP messaging server may, optionally in other embodiments, further include a recipient service information obtaining module and a determining module. The recipient service information obtaining module is configured to obtain the service information of the recipient terminal from a network address book, or from an ENUM DNS server, or from a recipient network server. The determining module is configured to determine whether a service having the same service type corresponding to the SIP message is included in the service information based on the obtained recipient service information, or to determine whether the recipient network device supports the service corresponding to the SIP message based on a domain corresponding to a Request URI in the SIP message. If the service having the same service type corresponding to the SIP message is included in the service information or the recipient network device supports the service corresponding to the SIP message, the SIP message is forwarded by the transceiving module; otherwise, the SIP message is sent from the confirming module to the interworking module.

The IW-GW includes a receiving module, a recipient service information obtaining module, a selecting module, a converting module, and a forwarding module.

Therein, the receiving module is configured to receive the SIP message. The recipient service information obtaining module is configured to obtain the service information of the recipient terminal from a network address book, or from an ENUM DNS server, or from a recipient network server. The selecting module is configured to select one service from the service information which is obtained by the recipient service information obtaining module. The converting module is configured to perform the protocol conversion on the SIP message to convert it into a message corresponding to the service selected by the selecting module. The forwarding module is configured to send the message converted by the converting module to the corresponding non-SIP messaging system.

In the present embodiment, there may be a plurality of conversion modules in the IW-GW, each of which corresponds to a different recipient service. Thus, the selecting module determines a conversion module where the selected service information is to be sent for the protocol conversion.

In other embodiments, the IW-GW further includes a session module. At this point, upon receipt of the SIP message, the receiving module further sends the SIP message to the session module which establishes a session with the sender terminal based on the SIP message. When the SIP messaging server participates in the transmission for the SIP session message, the interworking module in the SIP messaging server further establishes a session with the IW-GW, and the transceiving module further receives the SIP session message corresponding to the SIP message. Therefore, the SIP session message is sent to the IW-GW via the established session.

Accordingly, the session module in the IW-GW receives the SIP session message, and sends it to the converting module. Then, the converting module performs the protocol conversion on the SIP session message, and sends the converted SIP session message to the forwarding module.

Figure 11:
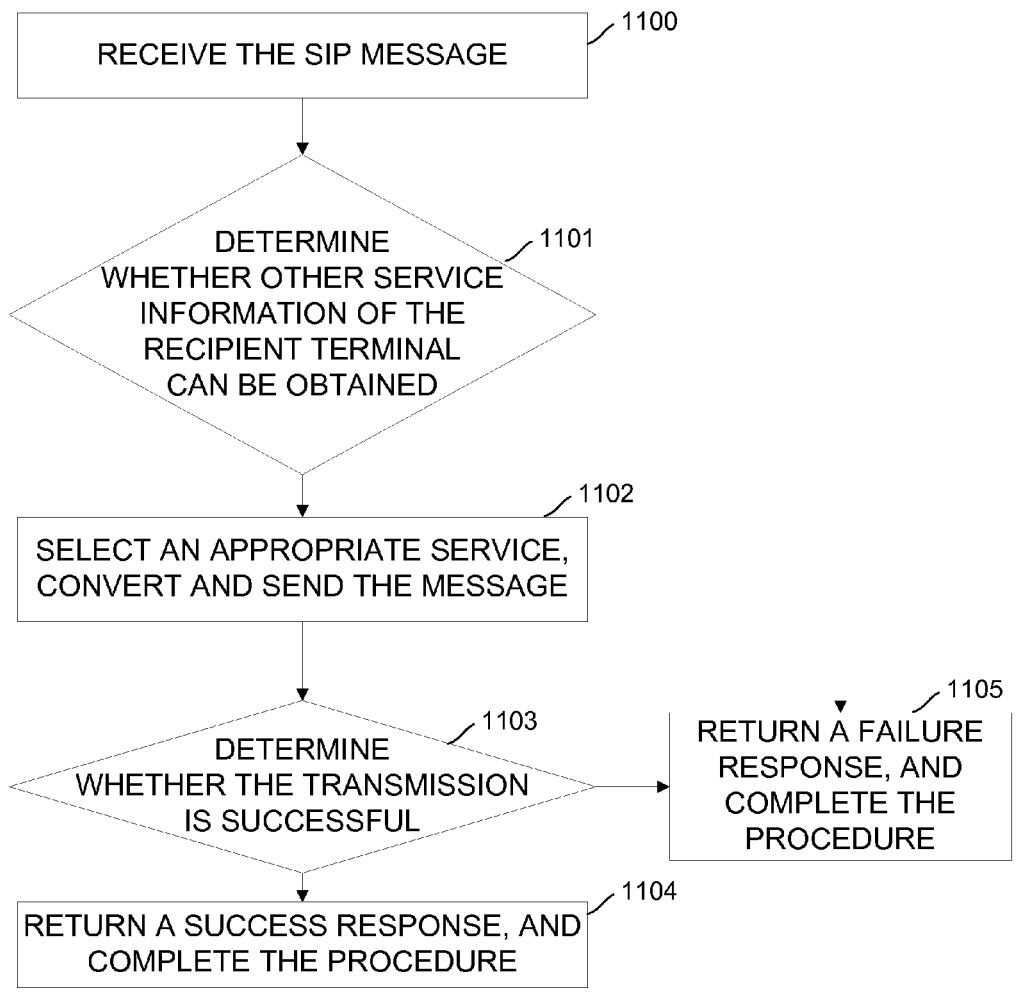
FIG. 11 illustrates a flowchart of a method for message processing performed by the interworking gateway according to an embodiment of the present invention.

FIG. 11 is a flowchart of a method for message processing performed by the interworking gateway according to an embodiment of the present invention. As shown in FIG. 11, the method includes steps as follows.

Step 1100: The IW-GW receives the SIP message sent from the SIP messaging server.

If there is another protocol adopted between the SIP messaging server and the IW-GW, the message using the another protocol is received.

Step 1101: It is determined whether other service information of the recipient terminal can be obtained or not. If the other service information of the recipient terminal can be obtained, step 1102 is performed; otherwise, step 1105 is performed.

At this step, it may directly determine whether the recipient terminal has other services based on a service identification of the recipient terminal in the SIP message. For example, it is determined that the recipient may receive a short message when the service identification of the recipient is an MSISDN number. Or, it may obtain other service information of the recipient by querying an ENUM DNS, or querying a network address book, or querying a recipient network server, bases on the service identification of the recipient terminal in the SIP message. For example, when the service identification of the recipient is an SIP URI, other service information of the recipient is obtained by querying the ENUM DNS, i.e. obtaining the information that the recipient uses an MMS service with its corresponding identification being a certain MSISDN number.

Step 1102: An appropriate recipient service is selected for the message transmission.

At this step, the IW-GW may select an interworking type based on the received SIP message content and/or the priority of the recipient service obtained by querying the ENUM DNS. If an SIP session invitation is received, the IW-GW selects an appropriate recipient service based on a description of the session type in the invitation, in order to substitute for the recipient to receive the invitation at first and to receive the actual message content later on, wherein the actual message content is sent in another format of the messaging services. If session is supported in the recipient messaging service, the IW-GW may convert the SIP session invitation into another session invitation of the messaging service, and may send the converted session invitation.

When no appropriate recipient service is selected at this step, the transmission may be regarded as a failure, thus, step 1105 is performed.

Step 1103: It is determined whether the transmission is successful. If it is determined that the transmission is successful, step 1104 is performed; otherwise, step 1105 is performed.

At this step, the IW-GW may determine whether the transmission is successful based on a response from the recipient messaging service system.

Step 1104: A success response corresponding to the received message is replied, and the procedure is completed.

Step 1105: A failure response corresponding to the received message is replied, and the procedure is completed.

In the present embodiment, if the SIP message is sent as an SIP MESSAGE, the SIP messaging server determines that the interworking is required. Thereafter, rather than determine the interworking type, the SIP messaging server directly sends the SIP message to the IW-GW which determines the interworking type instead. And then, the SIP message is converted into a non-SIP message and the non-SIP message is sent to a corresponding non-SIP messaging system by the interworking gateway. The detailed description of the technical solution provided in the second embodiment of the present invention will be made below taking an example that the SIP message is sent from the CPM user to the recipient terminal which does not support the CPM.

Figure 12:
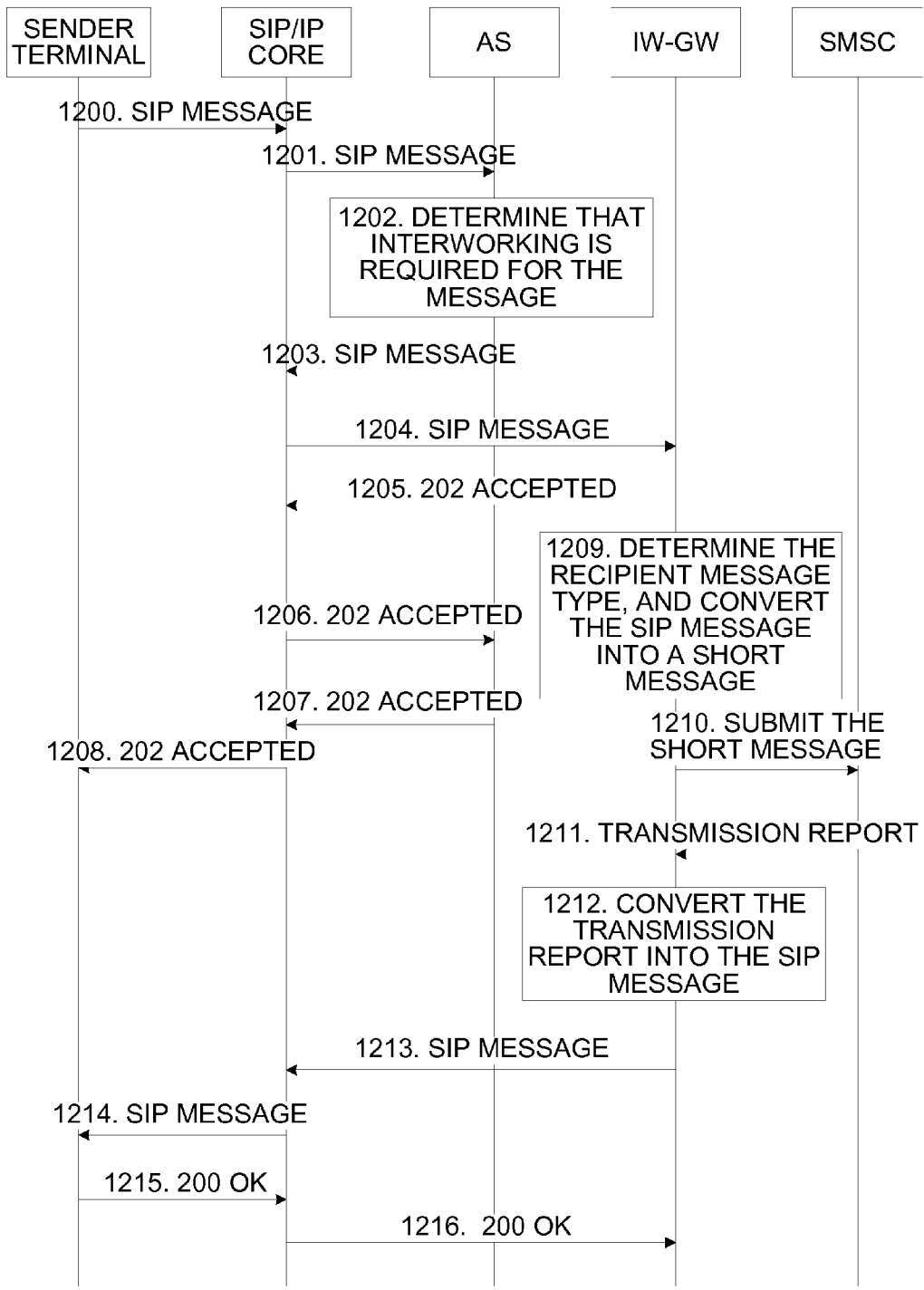
FIG. 12 illustrates a flowchart of a method for message transmitting in terms of a CPM user according to an embodiment of the present invention.

FIG. 12 illustrates a flowchart of a method for message transmitting in terms of the CPM user according to an embodiment of the present invention. As shown in FIG. 12, except that step 1202 and step 1209 in the present method differ from step 702 and step 709 shown in FIG. 7 respectively, other steps are identical with the corresponding steps in FIG. 7, which are omitted herein.

Step 1202: The AS determines that there is no CPM service provided in the recipient network based on the recipient network information stored in the sender network, and further determines to perform the interworking and forwarding via the IW-GW based on a forwarding configuration of the sender or based on the SIP response message.

Step 1209: Upon receipt of the SIP message, the IW-GW determines the message type which is supported by the recipient terminal, determines to perform the interworking and forwarding via short message, and then converts the SIP message into the short message.

At this step, the IW-GW obtains other services of the recipient terminal and the identifications thereof by querying the ENUM or querying the network address book. Next, according to obtained priorities of other services of the recipient and message body contents of the SIP message, for example, when an SMS form is of the highest priority in the obtained service information of the recipient terminal, and the SIP message has a shorter length of the message body contents in this embodiment, it is determined to forward the message in the SMS form. Therefore, the SIP message is converted into the short message.

If an indication is carried in the SIP message indicating that a transmission report is required, the IW-GW also needs to store the SIP message temporarily, and to associate the temporarily stored SIP message with the converted short message. Moreover, the IW-GW further needs to set the sender of the converted message as a number, wherein the number includes: a number allocated to an IW-GW SP, which is configured to route a message replied by the recipient terminal to the IW-GW, and also a number identifying the sender terminal uniquely, which is configured to route a response message replied by the recipient terminal to the sender terminal. The number identifying the sender terminal uniquely is obtained by a reverse ENUM query based on a sender SIP URI. If the sender is identified by a TEL URI, a telephone number therein is utilized directly.

In the present embodiment, if the SIP message is of an SIP INVITE type, the SIP messaging server determines that the interworking is required, and then sends the SIP message to the IW-GW. The IW-GW determines the interworking type and establishes a session with the sender terminal. Thus, the SIP session message is received by the IW-GW via the established session. After the protocol conversion corresponding to the interworking type performed on the SIP session message, the IW-GW sends the converted non-SIP message to the corresponding non-SIP messaging system.

As can be seen from the aforementioned description, according to the technical solutions provided in the embodiments of the present invention, the SIP message is routed and forwarded by the SIP messaging server. When the SIP messaging server determines based on the received SIP response that the message interworking is required, it sends the SIP message to the IW-GW. The IW-GW performs the protocol conversion and forwards the SIP message. With respect to the SIP session message which requires an SIP session for carry, the IW-GW may receive the SIP session message via a session after the session is established between the sender SIP terminal and the IW-GW, and may perform the protocol conversion and forward the SIP session message. Consequently, in the instance that the sender terminal is not aware of the protocol type supported by the recipient terminal, nor does the recipient set a forwarding configuration, or in the instance that the recipient terminal does not support the service corresponding to the SIP message, or in the instance that the recipient terminal which supports the service corresponding to the SIP message is off-line, it may send the SIP message to the non- SIP messaging system corresponding to the recipient terminal via the IW-GW in all the instances mentioned above. In this way, it is ensured that the SIP message is sent to the non-SIP messaging system corresponding to the recipient terminal and is then sent to the recipient terminal by the non-SIP messaging system.

It is appreciated by those skilled in the art that the entire or partial procedure of the methods according to the aforementioned embodiments may be implemented with related hardware when instructed by computer program. The program may be stored in a computer readable storage media. During execution, the program may include the procedures of the methods according to various embodiments as mentioned above. The storage media may be a magnetic disc, an optical disc, a Read-Only Memory (ROM) or a Random Access Memory (RAM), etc.

The foregoing is merely preferred embodiments of the present invention and is not intended to be limiting as to the scope of the present invention. Any modifications, equivalents, improvements made within the spirit and principle of the present invention shall be construed as fall within the scope of the present invention.

The invention claimed is:

1. A method for message interworking, comprising:
   receiving, by a Session Initiation Protocol (SIP) messaging server, an SIP message from a sender terminal, and routing the SIP message to a recipient;
   receiving, by the SIP messaging server, an SIP response to the SIP message;
   determining, by the SIP messaging server according to forwarding information preset in the SIP messaging server, that the message interworking is required when the SIP response is a failure response indicating that a target network of the recipient does not support the SIP message;
   sending, by the SIP messaging server, the SIP message to an interworking gateway;
   selecting, by the interworking gateway, a recipient terminal service;
   performing, by the interworking gateway, a protocol conversion on the SIP message, based on the selected recipient terminal service, to render a non-SIP message; and
   sending, by the interworking gateway, the non-SIP message to the non-SIP messaging system corresponding to the selected recipient terminal service.

2. The method of claim 1, wherein sending the SIP message to the interworking gateway by the SIP messaging server comprises:
   determining, by the SIP messaging server, an interworking type;
   selecting a corresponding interworking gateway based on the interworking type and a preset relationship between the interworking type and the interworking gateway, and forwarding the SIP message to the interworking gateway, or
   selecting a corresponding interworking gateway based on a preset relationship between the interworking type and the interworking gateway, and sending the SIP message to the interworking gateway, so that the interworking gateway establishes a session between the sender terminal and the interworking gateway.

3. The method of claim 2, wherein determining the interworking type by the SIP messaging server comprises:
   determining the interworking type based on at least one of the group consisting of: interworking and forwarding information preset by the sender, an SIP message type, and a Request Uniform Resource Identifier in the SIP message.

4. The method of claim 2, wherein determining the interworking type by the SIP messaging server comprises:
   obtaining, by the SIP messaging server, service information of a recipient terminal by at least one of the following steps: (a) querying a Telephone Number Mapping (ENUM) Domain Name System server, (b) querying a network address book, and (c) querying recipient configuration information from a recipient network based on the Request URI in the SIP message; and determining the interworking type based on the obtained service information of the recipient terminal.

5. The method of claim 1, wherein before routing the SIP message to the recipient, the method further comprises:
   determining whether a Request URI in the SIP message is an SIP URI;
   performing the step of routing the SIP message to the recipient when it is determined that the Request URI in the SIP message is the SIP URI; and
   if it is determined that the Request URI in the SIP message is not the SIP URI, then determining whether the SIP URI can be obtained based on the Request URI, and performing the step of routing the SIP message to the recipient when it is determined that the SIP URI can be obtained based on the Request URI; or, directly performing the step of determining that message interworking is required when it is determined that the SIP URI cannot be obtained based on Request URI.

6. The method of claim 1, wherein before routing the SIP message to the recipient, the method further comprises:
   obtaining service information of the recipient terminal, and determining whether the service information is identical with a service type corresponding to the SIP message, and performing the step of routing the SIP message to the recipient when it is determined that the service information is identical with the service type corresponding to the SIP message; and otherwise, directly performing the step of determining that message interworking is required when it is determined that the service information is not identical with a service type corresponding to the SIP message.

7. The method of claim 1, wherein before routing the SIP message, the method further comprises:
   determining whether a recipient network device supports a service corresponding to the SIP message based on a domain corresponding to a Request URI in the SIP message, and performing the step of routing the SIP message to the recipient when it is determined that the recipient network device supports the service corresponding to the SIP message; otherwise, directly performing the step of determining that message interworking is required when it is determined that the recipient network device does not support the service corresponding to the SIP message.

8. A Session Initiation Protocol (SIP) messaging server, comprising:
   a transceiving module configured to receive an SIP message from a sender terminal, to route the SIP message to a recipient, and to receive an SIP response to the SIP message;
   a confirming module configured to determine based on the SIP response received by the transceiving module whether interworking is required,
   the confirming module is further configured to determine, according to forwarding information preset in the SIP messaging server, that message interworking is required when the SIP response is a failure response indicating that a target network of the recipient does not support the SIP message; and an interworking module configured to forward the SIP message to an interworking gateway when the confirming module determines that the message interworking is required, wherein the interworking gateway is configured to:
- select, with respect to the SIP message, a recipient terminal service,
- perform a protocol conversion on the SIP message, based on the selected recipient terminal service, to render a non-SIP message, and
- send the non-SIP message to the non-SIP messaging system corresponding to the selected recipient terminal service.

9. The SIP messaging server of claim 8, further comprising: a storage module configured to store a relationship between an interworking type and an interworking gateway;
wherein the interworking module further determines the interworking type based on the SIP response, and forwards the SIP message based on the stored relationship to the interworking gateway corresponding to the interworking type.

10. The SIP messaging server of claim 9, further comprising a recipient service information obtaining module configured to obtain service information of the recipient terminal from a network address book, or from an ENUM DNS server, or from a recipient network server;
wherein the interworking module further determines the interworking type based on the service information of the recipient terminal.

11. The SIP messaging server of claim 10, further comprising: a determining module configured to determine based on the obtained recipient service information about whether a service having a same service type corresponding to the SIP message is included in service information, or to determine based on a domain corresponding to a Request Uniform Resource Identifier in the SIP message whether a recipient network device supports the service corresponding to the SIP message;
if the service having the same service type corresponding to the SIP message is included in the service information or the recipient network device supports the service corresponding to the SIP message, the SIP message is forwarded by the transceiving module; otherwise, the SIP message is sent from the confirming module to the interworking module.

12. A method for message interworking, comprising:
receiving, by a Session Initiation Protocol (SIP) messaging server, an SIP message from a sender terminal, and routing the SIP message to a recipient;
receiving, by the SIP messaging server, an SIP response to the SIP message;
determining, by the SIP messaging server according to forwarding information preset in the SIP messaging server, that the message interworking is required when the SIP response is a failure response indicating that a target network of the recipient does not support the SIP message;
sending, by the SIP messaging server, the SIP message to an interworking gateway; and
establishing, by the interworking gateway, a session between the interworking gateway itself and a sender terminal based on the SIP message, receiving an SIP session message via the established session, performing a protocol conversion on the SIP session message and then sending the converted non-SIP message to a corresponding non-SIP messaging system in the target network, wherein the step of establishing further comprises:
selecting, by the interworking gateway, a recipient terminal service; and
determining an interworking type based on the selected recipient terminal service.

13. The method of claim 12, wherein selecting the recipient terminal service by the interworking gateway comprises:
obtaining, by the interworking gateway, service information of a recipient terminal corresponding to a Request URI by implementing at least one of the following steps: (a) querying an ENUM DNS server, (b) querying a network address book, and (c) querying a network server in the recipient terminal based on the Request URI in the SIP message; and selecting one recipient terminal service from the service information.

14. An interworking gateway, comprising: a receiving module, a recipient service information obtaining module, a selecting module, a converting module, and a forwarding module, wherein,
the receiving module is configured to receive a Session Initiation Protocol (SIP) message from a SIP messaging server, and wherein the SIP message is sent from the SIP messaging server after determining, by the SIP messaging server according to forwarding information preset in the SIP messaging server, that message interworking is required when the SIP response is a failure response indicating that a target network of the recipient does not support the SIP message;
the recipient service information obtaining module is configured to obtain service information of a recipient terminal from a network address book, or from a Telephone Number Mapping (ENUM) Domain Name System server, or from a recipient network device;
the selecting module is configured to select one service from the service information of the recipient terminal obtained by the recipient service information obtaining module;
the converting module is configured to perform a protocol conversion on the SIP message to convert the SIP message into a non-SIP message corresponding to the one service selected by the selecting module; and
the forwarding module is configured to send the non-SIP message converted by the converting module.

15. The interworking gateway of claim 14, further comprising a session module, and wherein,
the receiving module is further configured to send the SIP message to the session module upon receipt of the SIP message; and
the session module is configured to establish a session with a sender terminal based on the SIP message, and to receive a SIP session message and send the SIP session message to the converting module; and
the converting module is further configured to perform a protocol conversion on the SIP session message to render a non-SIP message, and then send the non-SIP message to the forwarding module.

* * * * *